United States Patent [19]

Rafikian et al.

[11] Patent Number: 4,709,881
[45] Date of Patent: Dec. 1, 1987

[54] SAFETY LOWERING OR DESCENT PARACHUTE SYSTEM FOR DISABLED HELICOPTERS AND OTHER SIMILAR TYPES OF HOVERING AIRCRAFT

[75] Inventors: Faraz Rafikian, 9529 Treyford Ter., Gaithersburg, Md. 20879, by Faraz Rafikian, executor; Manoucher Rafikian, deceased, late of Gaithersburg, Md.

[73] Assignee: Faraz Rafikian, Rockville, Md.

[21] Appl. No.: 883,685

[22] Filed: Jul. 9, 1986

[51] Int. Cl.⁴ .............................................. B64D 17/42
[52] U.S. Cl. .................................. 244/17.15; 244/139
[58] Field of Search ............... 244/138 R, 138 A, 139, 244/17.15, 7 B

[56] References Cited

U.S. PATENT DOCUMENTS

| | | | |
|---|---|---|---|
| 1,023,233 | 4/1912 | Williams | 244/17.15 |
| 1,084,806 | 1/1914 | Lister | 244/17.15 |
| 1,541,534 | 6/1925 | Souder | 244/17.15 |
| 1,705,489 | 3/1929 | Mladinich | 244/17.15 |
| 2,673,051 | 3/1954 | Frost | 244/139 |
| 3,138,348 | 6/1964 | Stahmer | 244/17.15 |
| 3,246,864 | 4/1966 | Mack et al. | 244/138 A |

*Primary Examiner*—Jeffrey V. Nase
*Assistant Examiner*—Rodney Corl
*Attorney, Agent, or Firm*—Schwartz & Weinrieb

[57] ABSTRACT

A parachute-type safety lowering or descent system (10) for helicopters or other types of hovering aircraft includes a rotor hub assembly (12) to which is secured to the top thereof a parachute housing (14), for containing the safety lowering parachute, through means of a dual set of vertically spaced ball bearings (52, 58) for rotationally isolating the parachute housing (14) from the induced rotation effects of the hub rotor assembly (12) under normal aircraft operating conditions. In an emergency, however, such as, for example, in the case of a rotor, rotor blade, rotor hub assembly, or rotor drive engine failure, malfunction, fracture, or separation, the safety lowering parachute will be deployed whereupon the entire weight load of the aircraft will be borne by the safety parachute. Under such conditions, and load factors, the ball bearings (58) will be subjected to substantial impact or impulse forces as to freeze, jam, or become otherwise damaged whereby induced rotational effects will be transferred from the rotor hub assembly (12) to the parachute housing (14) and the parachute deployed therefrom. Such rotational effects can cause twisting, tangling, or other fouling of the parachute shroud lines connected to the housing rungs (70) whereby collapse of the parachute can occur with consequent loss of support by the parachute for the disabled aircraft. In order to prevent or counteract such induced rotational forces, pivotably deployed air brakes (84) in the form of arcuately shaped wings or vanes are moved in an arcuate manner away from their stowed position against the outer peripheral surface of the parachute housing so as to form with the housing peripheral surface air pockets (86) within which captured air causes substantial rotational resistance which counteracts the induced rotation of the housing (14) from the rotor hub assembly (12) and thereby terminates such rotational movement so as to permit complete and proper deployment of the safety parachute without risking collapse of the same and loss of support of the aircraft.

20 Claims, 3 Drawing Figures

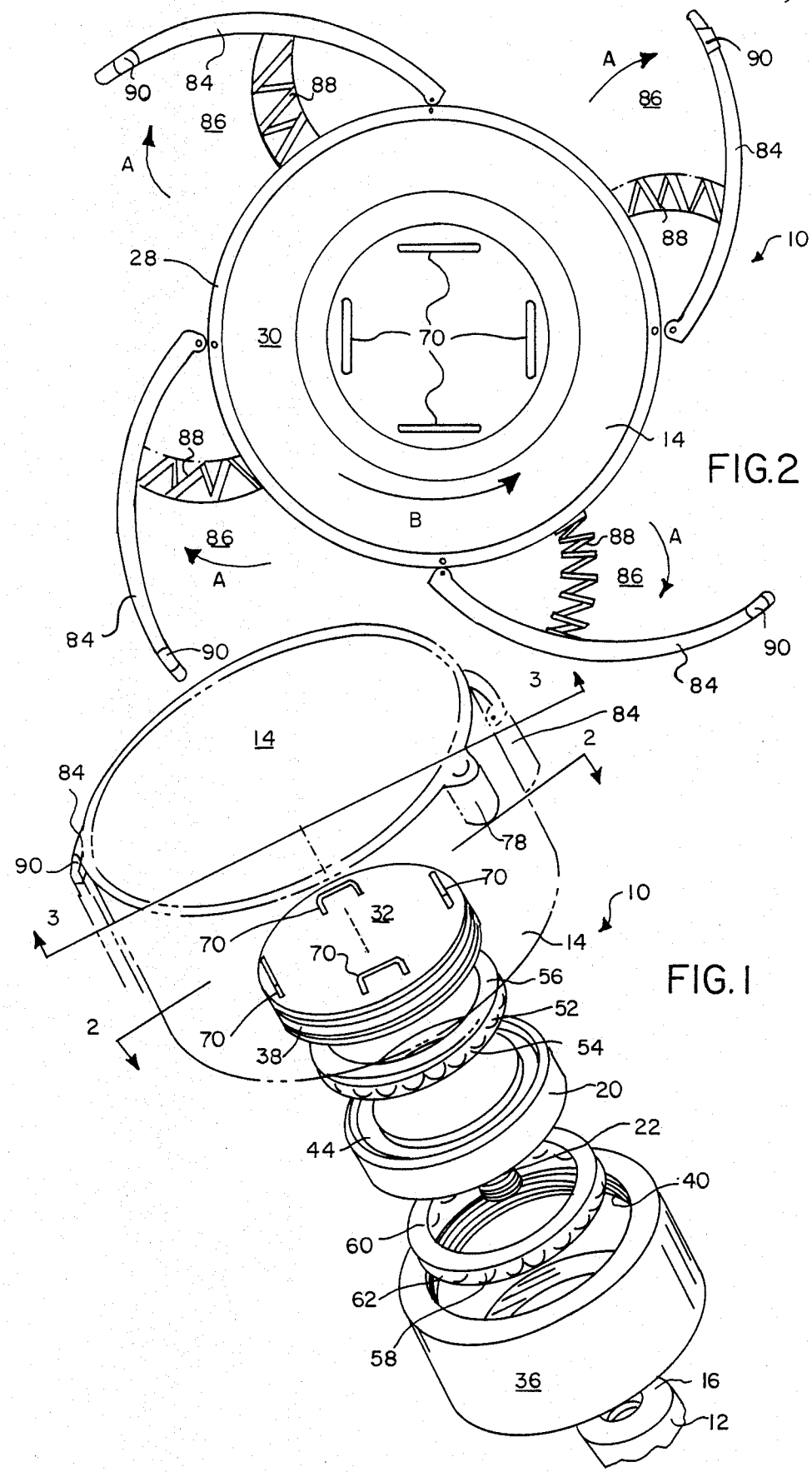

SAFETY LOWERING OR DESCENT PARACHUTE SYSTEM FOR DISABLED HELICOPTERS AND OTHER SIMILAR TYPES OF HOVERING AIRCRAFT

BACKGROUND OF THE INVENTION

1. Field of the Invention:

The present invention relates generally to helicopters and/or other similar types of hovering aircraft, and more particularly to a parachute-type safety lowering or descent system for helicopters and/or other similar types of hovering aircraft whereby a disabled or inoperative airborne helicopter and/or similar type of hovering aircraft can nevertheless achieve a relatively soft landing as opposed to a crash landing which would obviously be detrimental to both the aircraft and its personnel aboard the aircraft.

2. Description of the Prior Art:

As is well known in the art, helicopters and similar types of hovering aircraft achieve and maintain their airborne mode as a result of the proper performance of the main overhead rotor or rotors, and as is additionally appreciated, such aircraft exhibit virtually no glide characteristics upon disablement of the rotor or rotors, whether such is due in fact to, for example, a rotor blade separation or fracture, in whole or in part, relative to the rotor blade hub, a failure in the main rotor drive engine, or the like. Consequently, upon disablement or inoperativeness of the main rotor or rotors, or the main rotor drive engine, and even under those conditions wherein the rotor or rotors are rotating freely in a non-powered mode whereby a slower rate of descent may be achieved than would be able to be achieved under the conditions wherein the rotor or rotors were not at all rotating, or had been separated from the aircraft, the aircraft would in all probability crash, or certainly land in a manner which would not be considered a relatively safe or acceptable soft-landing, with a consequent loss of both the aircraft and personnel. Due to the normal mode of operation of helicopters or similar type of hovering aircraft, it is further appreciated that such aircraft usually fly at relatively low altitudes. Consequently, should the aircraft experience rotor, rotor blade, or rotor drive engine failure, the aircraft would probably be at an altitude which would render it unsafe for personnel to jump from the aircraft to the ground without deploying their parachutes, whereas, on the other hand, the aircraft would similarly be at an altitude which is considered too low for the deployment of the personnel parachutes if in fact the airmen did jump from the aircraft toward the ground. As a result, as is often the unfortunate situation, should the rotor or rotor blades, or the rotor drive engine, experience a malfunction or failure, both the aircraft and its personnel are in fact lost or seriously damaged, or critically injured or killed, respectively. A need therefore exists for the provision of a safety lowering or descent system for helicopter or other type of hovering aircraft whereby such aircraft can in fact achieve a relatively soft and safe descent and landing under rotor, rotor blade, or rotor drive engine failure or malfunction conditions.

Such a helicopter or other type of hovering aircraft safety lowering or descent system is in fact shown, for example, to already exist within the U.S. Pat. No. 3,138,348 which issued to Stahmer in 1964, however, it is submitted that such a disclosed system has serious operational disadvantages or drawbacks which render the operativeness of such a system as being questionable. It is noted, for example, that a parachute descent system is provided for the helicopter aircraft wherein the descent or lowering parachute, for safely lowering the helicopter at a relatively safe descent rate of speed under the engine failure conditions, is housed within a housing 40 which is fixed atop the rotor hub 20 by means of a mounting plate 30. Consequently, as might be appreciated, it is submitted that a system such as that of Stahmer might be operationally defective under actual operational or deployment conditions in view of the fact that the mounting plate 30, housing 40, and the parachute 60 contained within housing 40, will all rotate along with the rotor hub 20. As a matter of fact, it is seen from FIG. 2 of Stahmer, for example, that the tie lines 110 of the parachute 60 are directly secured to rotor hub 20 by means of a ring 114 and an attachment member 120. Consequently, upon deployment of the safety parachute 60 from the housing 40 under engine failure conditions, it is highly likely that the tie lines 110 of the parachute will become twisted about or between themselves due to the continued rotation of the rotor hub 20 under partial power or inertial conditions. Such twisting or fouling of the parachute tie lines will in fact prevent full and proper deployment of the chute whereby the same will not in fact be able to properly and safely sustain or support the disabled aircraft with an inevitable loss or damage to the craft, as well as, of course, serious injury of death to its airborne personnel.

The aforenoted type of operational defect or drawback appears to have been resolved within a system such as that proposed in Koppen (German Offenlegungsschrift No. 2503461) which issued in 1976 wherein a dual-tier or dual-level ball bearing system is employed for rotationally separating the rotor blades and the rotor hub from the parachute housing. While it is noted that the precise purpose of such a ball-bearing system is in fact to prevent the parachute lines from becoming twisted as a result of either the rotation of the helicopter rotor or the helicopter per se, there is nevertheless an operational disadvantage, drawback, or defect present within even such a system such as that proposed by Koppen, although such was apparently not recognized by such inventor. Should a rotor or rotor drive engine failure occur and the parachute safety lowering or descent system be deployed, upon deployment of the safety lowering or descent-controlling parachute, severe impact or impulse forces attendant the sudden deployment of the parachute and the consequent support of the helicopter weight load will be immediately and instantaneously transferred to the rotor hub assembly through means of at least one of the sets of the dual-level ball bearings. Such forces or loads will tend to cause the ball bearings to at least momentarily freeze or jam, and possibly become irrevocably damaged, frozen, or jammed, and this may be particularly true of the ball bearing inner and/or outer race members. In light of these conditions, the parachute housing will no longer experience rotational separation, freedom, or independence from the rotor hub assembly, and consequently, the parachute housing, along with the parachute and the parachute tie lines, will tend to rotate along with the helicopter rotor blades, the rotor hub assembly, or the helicopter per se, thereby leading to twisting or fouling of the parachute tie lines. A similar system, with similarly potentially problematical operational disadvantages is likewise shown in U.S. Pat. No. 2,812,147 which issued to Trabucco in 1957.

A need therefore still remains to provide a helicopter or similar type hover-craft safety parachute lowering or descent system wherein the aircraft and its personnel can in fact be safely lowered to the ground under rotor, rotor blade, rotor hub, or rotor drive engine failure conditions.

A primary objective then of the present invention is to provide a new and improved helicopter or similar-type hover-craft parachute safety lowering or descent system.

Another objective of the present invention is to provide a new and improved helicopter or similar-type hover-craft parachute safety lowering or descent system which overcomes the various operational disadvantages, drawbacks, and defects of current or conventionally-known helicopter or similar-type hover-craft parachute safety lowering or descent systems.

Still another objective of the present invention is to provide a new and improved helicopter or similar-type hover-craft parachute safety lowering or descent system which can in fact safely lower a disabled helicopter and its personnel to the ground under, for example, rotor, rotor blade, rotor hub, or rotor drive engine failure conditions.

Yet another objective of the present invention is to provide a new and improved helicopter or similar-type hovercraft parachute safety lowering or descent system wherein under normal operating conditions of the helicopter or similar-type aircraft, the parachute safety lowering or descent system of the present invention may be stowed so as not to interfere with such normal operation of the aircraft and yet may be deployed under emergency, disablement conditions of the aircraft.

Still yet another objective of the present invention is provide a new and improved helicopter or similar-type hover-craft parachute safety lowering or descent system wherein when the parachute is disposed within its stowed position, the same is contained within an aerodynamically streamlined housing disposed atop the rotor hub assembly so as to not to interfere with the normal airborne performance characteristics of the aircraft.

Yet still another objective of the present invention is to provide a new and improved helicopter or similar-type hover-craft parachute safety lowering or descent system wherein when the parachute is deployed for its safety lowering or descent function, twisting, tangling, or fouling of the parachute tie or shroud lines will be prevented so as to insure full and complete or proper deployment of the chute system whereby in fact the disabled aircraft can be safely lowered to the ground at a proper or acceptable rate of descent in order to achieve a relatively soft and safe landing for preserving intact the aircraft per se as well as minimizing any injuries to on-board personnel.

A further objective of the present invention is to provide a new and improved helicopter or similar-type hover-craft parachute safety lowering or descent system wherein not only is there employed a dual set of ball bearings for initially rotatably isolating the parachute housing from the rotor hub assembly whereby induced rotational effects of the rotor are not impressed upon the parachute housing and the parachute contained therein so as not to twist, tangle, or foul the parachute tie or shroud lines, but in addition, means are mounted upon the exterior of the parachute housing so as to be movable from a stowed position to a deployed position so as to prevent any induced rotation from being transferred from the rotor hub assembly to the parachute housing under such load conditions wherein the ball bearings, and/or their inner and outer race members, may become jammed, frozen, or otherwise damaged, whereby in fact the parachute safety lowering or descent system of the present invention may be deployed for its safety lowering operation or descent function while preventing any entanglement, twisting, or other fouling of the parachute tie or shroud lines such that the parachute can be fully and properly deployed so as to be capable of achieving its controlled, safe lowering or descent of the disabled aircraft.

SUMMARY OF THE INVENTION

The foregoing and other objectives are achieved in accordance with the present invention through the provision of a helicopter or similar hover-craft safety lowering or descent parachute system which comprises a cylindrically configured parachute housing or container mounted atop the helicopter, or similar hover-craft having a rotor or rotors rotatable within a substantially horizontal plane and about a substantially vertical axis, rotor hub by means of a dual-level set of ball bearings which serve to rotationally isolate, separate, or render free and independent, the parachute housing from the rotor hub and the helicopter or other hover-craft rotor blade assembly. In this manner, induced rotation which might normally be transferred from the rotor hub assembly of the helicopter or other craft to the parachute housing is effectively prevented from being so transferred under normal aircraft flight conditions.

As has been noted hereinabove, when a safety lowering or descent parachute system, such as that characterized by the present invention, is normally employed in connection with disabled aircraft, the sudden weight and gravitational loads and forces impressed upon the entire system as a result of the deployment of the safety lowering parachute whereby the same will then be supporting the weight and load forces of the aircraft could easily tend to freeze, jam, or otherwise damage the aforenoted dual-set of ball bearings and/or the inner and outer ball bearing race members whereby in lieu of the parachute housing or container being rotationally isolated, separated, free, or independent with respect to the rotor hub assembly, the housing would now be, in effect, affixed with the rotor hub assembly whereby the housing would tend to rotate with the rotor hub assembly. This is obviously undesirable in view of the fact that the upon deployment of the parachute from the parachute housing or container for its safety lowering or descent operation or function, the parachute tie or shroud lines would tend to become tangled, twisted, fouled, or the like, such thereby causing collapsing of the parachute, or alternatively, effectively preventing actual proper or complete deployment of the same whereby the parachute could not in fact adequately or properly support the disabled aircraft for the intended safe and controlled lowering or descent thereof.

In accordance with the present invention then, there is provided a plurality, for example, four, air brakes, wings, vanes, or the like, which are mounted upon the exterior peripheral wall of the parachute housing. The air brakes or vanes are movable between a normal, stowed position wherein the brakes or vanes, in effect, concentrically surround the parachute housing, and an emergency deployed position wherein the brakes or vanes are pivotably moved about vertically extending axes so as to extend outwardly from the parachute housing exterior wall at a predetermined angle with respect thereto. The brakes or vanes therefore effectively define air pockets with the exterior parachute housing wall whereby the force of the air acting upon the brakes or vanes serves to effectively terminate or substantially reduce any significant rotation of the rotor hub assembly and the parachute housing so as to prevent any substantial entanglement, twisting, or fouling of the deployed parachute tie or shroud lines. The vanes or air brakes are spring-biased open by means of springs interposed between the vanes or air brakes, and the external wall surface of the parachute housing, and the vanes or air brakes are maintained in their stowed position against the biasing force of the springs by means of a parachute housing cover which engages upstanding tabs upon the free ends of the vanes or brakes. The housing cover is, in turn, maintained upon the parachute housing by means of permanent magnets encased within the housing cover and electromagnetic assemblies embodied within the parachute housing. In addition, explosive squibs are operatively associated with the magnets and magnetic assemblies whereupon desired actuation of the parachute deployment, the electrical circuitry controlling the electromagnetic assemblies is disconnected thereby releasing the electromagnetic connection between the assemblies and the permanent magnets of the housing cover, and simultaneously therewith, the electrical circuitry leading to the explosive squibs is connected so as to fire the same thereby explosively discharging the housing cover from the parachute housing so as to in fact permit deployment of the safety lowering or descent parachute. Release of the housing cover from the housing of course permits the opening or deployment of the air brakes or vanes under the influence of the biasing springs whereby the vanes or brakes can perform their braking or retarding function. It is to be appreciated that the vanes or brakes open in a direction counter to the direction of rotation of the rotor hub assembly such that any induced rotation of the parachute housing is counteracted by the air brakes or vanes. The deployment of the air brakes or vanes is of course achieved virtually simultaneously along with the deployment of the safety lowering or descent parachute whereby the parachute is able to be properly and completely deployed without encountering any entangling, twisting, or fouling of its tie or shroud lines so as to achieve the safe and controlled lowering or descent of the disabled aircraft without encountering any risk of collapse of the parachute due to any tangling, twisting, or fouling of the tie or shroud lines which would otherwise endanger the safe descent or lowering of the disabled aircraft.

BRIEF DESCRIPTION OF THE DRAWINGS

Various other objectives, features, and attendant advantages of the present invention will become more apparent as the same becomes better understood from the following detailed description when considered in connection with the accompanying drawings, in which like reference characters designate like or corresponding parts throughout the several views, and wherein:

FIG. 1 is an exploded perspective view of the new and improved helicopter or similar hover-craft parachute safety lowering or descent system constructed in accordance with the present invention and showing the cooperative parts thereof;

FIG. 2 is a horizontal cross-sectional view of the new and improved helicopter or similar hover-craft parachute safety lowering or descent system shown in FIG. 1 as taken along the line 2—2 of FIG. 1.

DESCRIPTION OF THE PREFERRED EMBODIMENTS

Figure 3:
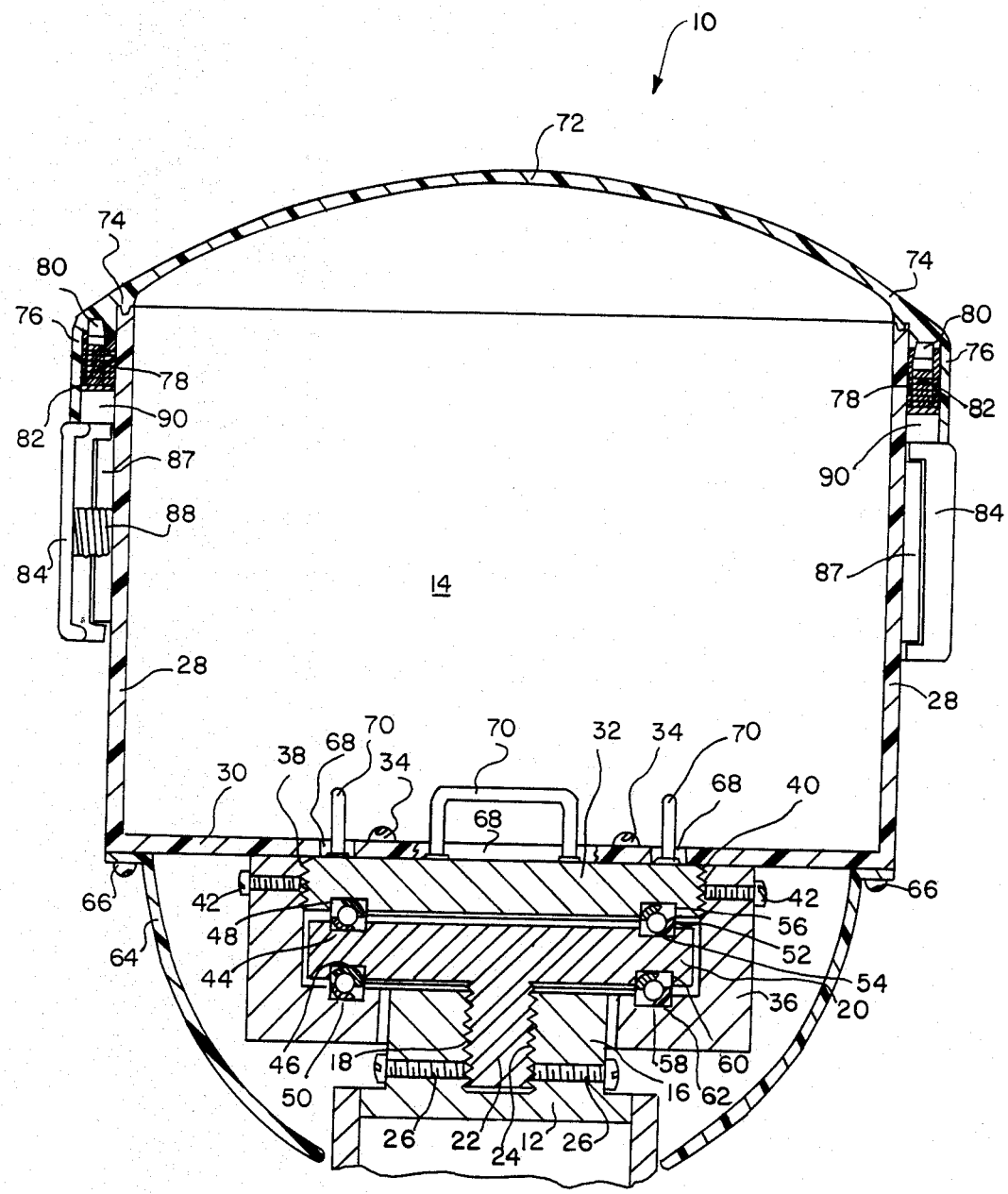
FIG. 3 is a vertical cross-sectional view of the new and improved helicopter or similar hover-craft parachute safety lowering or descent system shown in FIG. 1 as taken along the line 3—3 of FIG. 1.

Referring now to the drawings, and more particularly to the FIGS. 1-3, there is shown a new and improved helicopter or similar hover-craft parachute safety lowering or descent system which is constructed in accordance with the present invention and which is generally designated by the reference character 10. The system 10 is of course adapted to be employed in connection with a helicopter, or similar type hover-craft which includes a horizontally disposed rotor blade which is rotatable about a vertical axis, and the rotor hub assembly is disclosed at 12 as being vertically oriented or upstanding and rotatable about a vertical axis. In accordance with the particular features of the present invention, a parachute housing 14, for housing or containing the safety lowering or descent parachute system which may be employed in conjunction with the present invention but which, per se, does not form any part of the present invention, is adapted to be mounted atop the rotor hub assembly 12, and it is seen that the parachute housing 14 comprises an upstanding cylindrical housing which may be formed of a suitably hard plastic material, metal, fiberglass, or the like.

In order to in fact mount parachute housing 14 atop the rotor hub assembly 12, the rotor hub assembly 12 is provided with an upstanding, cylindrically configured socket portion 16 which is internally threaded as shown at 18, and a ball bearing inner race support plate 20, having an axially dependent, externally threaded shaft 22, is adapted to be mated therewith, the external threads thereof being designated at 24. It is seen that the inner race support plate 20 has a T-shaped configuration in cross-section, and in addition to the threaded engagement of the externally threaded shaft 22 of inner race support plate 20 with the internally threaded socket 16 of the rotor hub assembly 12, there is additionally provided fastener set screws 26 which are inserted radially inwardly through the socket portion 16 of hub assembly 12 so as to engage the lower dependent end of shaft section 22 of inner race support plate 20.

Parachute housing 14 is of course internally hollow so as to be capable of housing the safety lowering or descent parachute, not shown, and it is seen that housing 14 comprises an annular, upstanding wall portion 28 and a floor portion 30, with the top of the housing 14 being open. A ball bearing outer race parachute housing support plate 32 is fixedly secured to the undersurface of parachute housing by means of suitable fasteners, such as, for example, bolts 34, while a ball bearing outer race rotor hub support plate 36, having a substantially U-shaped cross-sectional configuration, is adapted to be fixedly attached to outer race parachute housing support plate 32. In particular, outer race parachute housing support plate 32 is externally threadedly as at 38, while the upper internal wall section of outer race rotor hub support plate 36 is internally threaded as at 40, and as is the case with the rotor hub socket 16 and its threadedly mated shaft portion 22 of inner race support plate 20, the threaded connection between outer race parachute housing support plate 32 and outer race rotor hub support plate 36 is additionally secured by means of threaded fasteners 42 extending through the upper end of outer race rotor hub support plate 36 so as to engage the outer peripheral surface of outer race parachute housing support plate 32.

An annular groove 44 is defined within the upper surface of inner race support plate 20, while a similar annular groove 46 is defined within the lower surface of inner race support plate 20. Another annular groove 48 is defined within the lower surface of outer race parachute housing support plate 32, while a similar annular groove 50 is defined within the upper surface of the bottom wall portion of the outer race rotor hub support plate 36. An upper set of ball bearings 52 is confined between an inner bearing race member 54 and an outer bearing race member 56, and the entire ball bearing assembly comprising outer race 56, inner race 54, and ball bearings 52 is disposed within annular grooves 44 and 48 of inner race support plate 20 and outer race parachute housing support plate 32, respectively, so as to be interposed between the inner support plate 20 and outer support plate 32. In a similar manner, a lower set of ball bearings 58 is confined between an inner bearing race member 60 and an outer bearing race member 62, and the entire lower ball bearing assembly comprising inner race member 60, outer race member 62, and ball bearings 58 is disposed within annular grooves 46 and 50 of inner race support plate 20 and outer race rotor hub support plate 36, respectively, so as to be interposed between the inner support plate 20 and outer support plate 36. As a result of the provision of the two sets of upper and lower ball bearings 52 and 58, it is to be appreciated that the parachute support housing 14 is rotationally isolated, separated, and rendered free and independent of the helicopter or hover-craft rotor blade assembly, not shown, of which the rotor hub assembly 12 forms an integral part. In this manner, under normal flight operation conditions, the parachute support housing 14 remains rotationally stationary, for example, about a vertical axis about which the rotor hub assembly 12 rotates. It is lastly noted that a substantially hemispherically shaped, inverted skirt member 64 is secured to the underside of the parachute housing 14 along the peripheral region thereof by means of suitable fasteners 66 so as to substantially engage the lower vertical sidewall portion of rotor hub assembly 12 at the central portion thereof, and in this manner, skirt 64 serves as a dust seal to prevent the entry of dust or dirt into the ball bearing assemblies 52 and 58 so as not to foul the same. Skirt 64 may be fabricated of a suitable, somewhat flexible material, such as, for example, a plastic, rubber, fiberglass, or the like.

The bottom or floor portion 30 of parachute support housing 14 is provided with an annular arrangement of slotted apertures 68, such as, for example, four, disposed in a substantially circular array about the central section thereof, and a corresponding number of inverted rings or rungs 70 are secured to the upper surface of outer race parachute housing support 32 so as to project vertically upwardly through the slotted apertures 68 and be disposed internally within the bottom portion of parachute housing 14. The rungs or rings 70 serve as the attachment points or means for the parachute tie or shroud lines, not shown. The upper portion of the parachute housing 14 is provided with a cover 72, and the cover 72 is adapted to be matingly fitted atop the upper peripheral edge portion of the parachute housing sidewall 28 through means of a suitable joint, such as, for example, the dovetail joint shown at 74. The parachute housing cover 72 is further provided with an annularly extending, dependent skirt portion 76 which is radially spaced outwardly from the upstanding sidewall portion 28 of the parachute housing 14, and in order to provide for the fixation of the parachute housing cover 72 upon the parachute housing 14, and in particular, upon the upper peripheral edge portion of upstanding wall 28 by means of the dovetail joint 74, vertically disposed stanchions 78, as best seen in FIGS. 1 and 3, are provided in a circular array about the upper, exterior wall surface portion of parachute sidewall 28. While only one or two of such stanchions 78 are shown, it is understood that at least four of such stanchions may be provided, or more, as may be desired. Permanent magnet members 80 may be incorporated within the overhanging or bridging portion of parachute housing cover 72 between the dovetail joint section 74 and the dependent skirt portion 76, at a circumferential locations corresponding to the dispositions of stanchions 78, and electromagnetic means may be incorporated within stanchions 78 so as to operatively cooperate with the permanent magnets 80 of the parachute housing cover 72 when such is desired. It is to be appreciated, for example, that when the parachute housing cover 72 is, for example, desired to be fixedly secured and retained upon the parachute housing 14, and particularly the sidewall 28 thereof, the electrical circuitry, not shown, operatively connected with the electromagnetic means of stanchions 78 is connected or closed such that the electromagnets thereof are activated for active cooperation with the permanent magnets 80 of the parachute housing cover 72. When it is desired to remove the parachute housing cover 72 from the parachute housing 14, the electrical circuitry and switch mechanisms, not shown, associated therewith, are such that electrical power to the electromagnetic assemblies of the stanchions 78 is terminated. Operatively associated with the permanent magnet and electromagnetic assemblies of the stanchions 78 and the parachute housing cover 72 are explosive squibs 82 which are also housed within stanchions 78, and it is to be further appreciated that the electrical circuitry of the squibs 82 is such, relative to the electromagnetic assemblies of stanchions 78, that when the electromagnetic assemblies are de-activated whereby magnetic attraction between the electromagnetic assemblies and the permanent magnets 80 of the parachute housing cover 72 is terminated, electrial power is simultaneously supplied to the electrical squibs 82 so as to activate the same whereupon the parachute housing cover 72 may be explosively discharged from the parachute housing 14 in preparation for the deployment of the safety lowering or descent parachute, not shown, housed within the parachute housing 14. The deployed parachute may comprise a baby or pilot parachute for facilitating deployment of the parachute system, and operatively connected to a single main or primary parachute, or alternatively, a cluster of several primary or main parachutes may be employed in addition to the baby or pilot parachute. Such parachute systems may be predetermined depending upon the size of the aircraft, gross weight of the aircraft, operational load characteristics of the aircraft, and other similar factors. The particular type of parachute system employed, however, does not constitute a part of the present invention. The parachute housing cover 72 is also preferably secured, in any suitable fashion, to the baby or pilot parachute, not shown, so as to prevent loss of the housing cover 72 once the same has been explosively discharged from the parachute housing 14.

As has been noted hereinabove, the dual set of ball bearings 52 and 58 serve to rotationally isolate the parachute housing 14 from the rotor blade rotor hub assembly 12 whereby the rotational movement or effects of the rotor hub assembly 12 are not transmitted to, or impressed upon, the parachute housing 14 so as not to cause corresponding rotation of the housing 14 as well as the parachute housed therein and the tie or shroud lines thereof secured to attachment or support rungs 70. In this manner, under normal operating conditions, the parachute is theoretically capable of being properly and fully deployed, without the likelihood of collapse or other deployment problems as a result of any entanglement, twisting, fouling, or the like, of the parachute tie or shroud lines. In actual operation, however, it has been found that upon initial deployment of the safety lowering or descent parachute, sudden impact or impulse forces, due to the sudden support by the parachute of the aircraft weight and load forces, is transmitted to or impressed upon the ball bearing assemblies, and in particular, upon the lower ball bearing assembly comprising ball bearings 58, inner bearing race 60, and outer bearing race 62, whereby freezing, jamming, or other operational damage to the bearing assembly is experienced. As a result, the rotational isolation or separation of the parachute housing 14 relative to the rotor hub assembly 12 is operatively destroyed whereby rotational forces are in fact transmitted to or impressed upon the parachute housing 14. Within a short period of time, it may be readily appreciated that the parachute tie or shroud line rungs 70 also rotate along with the parachute housing 14 in view of the fact that the rungs 70 are secured thereto through means of outer race parachute housing support plate 32, and consequently, entangling, twisting, fouling, or the like, of the parachute tie or shroud lines occur with the result that the deployment or sustained deployment of the parachute is adversely affected whereby in fact that originally deployed parachute can no longer adequately support the disabled aircraft in a controlled, safe descent under the emergency conditions in light of which the parachute system has in fact sought to be deployed, such as, for example, a failure, fracture, separation, or the like either in a rotor blade, the rotor hub, the rotor drive engine, or the like.

In order to therefore overcome the aforenoted operational drawbacks or disadvantages of conventional parachute deployment systems as has been discussed up to this juncture, the present invention contemplates the employment of additional means upon the parachute housing 14 in order to effectively brake, retard, and eliminate any rotational movement of the parachute housing 14 even when induced by means of the rotor hub assembly 12 through means of jammed, failed, frozen, or damaged ball bearing assemblies. In particular, and in accordance with the present invention, there is provided a plurality of air brakes, wings, vanes, or the like 84 which are pivotably supported upon the exterior sidewall portions 28 of the housing 14 so as to be movable from a stowed position as shown in FIGS. 1 and 3, at which position the air brakes or vanes 84 effectively annularly or concentrically surround the parachute housing sidewall 28 in a relatively or substantially aerodynamically streamlined manner, and a deployed or open position as shown in FIG. 2 whereby the air brakes or vanes 84 define with the outer surface portions of the parachute housing sidewall 28 air pockets 86. As noted in FIG. 2, the air brakes or vanes 84 are opened in a pivotable manner in a clockwise manner as denoted by the arrows A which is in a direction counter to the rotation of the rotor hub assembly 12, and the parachute housing 14 as induced thereby, as indicated by the arrow B in the counterclockwise direction. Consequently, the air effectively entrapped or captured within the air pockets 86 by means of the air brakes or vanes 84 operatively cooperating with the exterior surface portions or regions of the parachute housing sidewall 28 serves to impede, retard, and effectively terminate any induced rotation of the parachute housing 14 by means of the rotor hub assembly 12, and similarly with respect to the rotor hub assembly 12 per se. Consequently, entanglement, twisting, fouling, or the like, of the deployed parachute tie or shroud lines is effectively prevented with the consequent full and proper deployment of the safety lowering or descent parachute insured, as well as maintenance of the deployed state of the parachute.

The air brakes or vanes 84 are pivotably mounted upon the sidewall regions of the parachute housing 14 by means of vertically disposed hinge mechanisms 87, as best seen in FIG. 3, and in order to actually deploy the brakes or vanes 84 to their operative positions, coil spring biasing means 88 are interposed between the inner surfaces of the brakes or vanes 84 and the exterior sidewall regions of the parachute housing 14. Upstanding tabs or arms 90 are integrally formed upon the free or distal ends of the brakes or vanes 84, along the upper edge surfaces thereof, and these tabs or arms 90 are adapted to be secured beneath the overhanging skirt 76 of the parachute housing cover 72. In this manner, under normal operating conditions, the tabs or arms 90 are secured beneath the dependent skirt 76 of the parachute housing cover 72 against the opening biasing force of the coil springs 88, however, under disabling aircraft emergency conditions, when the safety lowering or descent parachute system of the present invention is desired to be deployed, and the parachute housing cover 72 has been explosively removed from the parachute housing 14 by means of the deactivation of the electromagnetic assemblies 78 of the stanchions, and the activation of the explosive squibs 82, the air brakes or vanes 84 will be permitted to move to their deployed positions under the influence of coil springs 88 in view of the fact that the upstanding tabs or arms 90 of the air brakes or vanes 84 have been released from their disposition beneath parachute housing cover skirt 76. The hinge mechanisms 87 of the vanes or brakes 84 may be suitably fabricated so as to predeterminedly limit the extent to which the vanes or brakes 84 can be opened, that is, to only a predetermined degree, or alternatively, extension struts or the like may be incorporated within the spring assemblies 88 so as to similarly limit the extent to which the vanes or air brakes are capable of opening under the deployed conditions to counteract any induced rotation of the parachute housing 14.

Obviously, many modifications and variations of the present invention are possible in light of the above teachings. For example, the safety lowering or descent parachute system of the present invention for a helicopter or other type of hover-craft is adapted to be activated by means of the aircraft pilot under a disabling or failure condition either with respect to the rotor hub assembly, a rotor blade, the rotor drive engine, or the like. However, it is further contemplated that should the emergency not only encompass an equipment failure of one of the types particularly noted, but in addition, should there be personnel injuries to the effect that the safety parachute system of the present invention cannot be activated manually, then the system of the present invention can be automatically activated through, for example, an altimeter control system, not shown. Should the disabled aircraft, for example, descend below a predetermined altitude level, the safety lowering or descent parachute system of the present invention would be automatically activated so as to deploy the parachute and the air brakes or vanes 84 whereby in fact a controlled, safe descent of the aircraft can be achieved. It is further contemplated that to further insure the achievement of a soft landing on the ground, or alternatively, a safe landing upon water, the bottom or underside portion of the aircraft can be provided with inflatable cushions or pontoons. Still yet further, in order to prevent the accidental or undesirable deployment of the air brakes or vanes 84 at a premature time, and while the air brakes or vanes have been noted as being secured in their stowed position by means of the parachute housing cover skirt portion 76 engaging the upstanding tabs or arms 90 of the air brakes or vanes 84, it is further contemplated that suitable electromagnetic assemblies can be established between the brakes or vanes 84 and the parachute housing sidewall 28 so as to retain the same in the closed position until the circuitry is disconnected simultaneously with the electromagnets in the stanchions 78 with the concomitant firing of the explosive squibs 82. It is therefore to be understood that within the scope of the appended claims, the present invention may be practiced otherwise than as specifically described herein.

We claim:

1. A safety lowering or descent system for rotor aircraft, comprising:
   a rotor hub assembly;
   a parachute housing mounted atop said rotor hub assembly for housing a safety lowering or descent parachute for said aircraft under aircraft disabled conditions;
   ball bearing means interposed between said rotor hub assembly and said parachute housing for rotationally isolating said parachute housing from said rotor hub assembly under normal operating conditions; and
   means movably mounted upon said parachute housing, between a first stowed position and a second operative position, and operative in conjunction with deployment of said parachute under said aircraft disabled conditions, for substantially reducing rotation of said parachute housing as induced by said rotor hub assembly through said ball bearing means under weight load support conditions of said aircraft by said safety lowering or descent parachute.

2. A safety lowering or descent system for rotor aircraft, comprising:
   a rotor hub assembly;
   a parachute housing mounted atop said rotor hub assembly for housing a safety lowering or descent parachute for said aircraft under aircraft disabled conditions;
   bearing means interposed between said rotor hub assembly and said parachute housing for rotationally isolating said parachute housing from said rotor hub assembly under normal operating conditions; and
   means movably mounted upon said parachute housing between a first stowed position and a second operative position, in response to deployment of said parachute under said aircraft disabled conditions, for substantially reducing rotation of said parachute housing as induced by said rotor hub assembly through said bearing means under weight load support conditions of said aircraft by said safety lowering or descent parachute.

3. A safety lowering or descent system for rotor aircraft, comprising:
   a rotor hub assembly;
   a parachute housing mounted atop said rotor hub assembly for housing a safety lowering or descent parachute for said aircraft under aircraft disabled conditions;
   bearing means interposed between said rotor hub assembly and said parachute housing for rotationally isolating said parachute housing from said rotor hub assembly under normal operating conditions; and
   air brake means pivotably mounted upon said parachute housing between a first stowed position and a second operative position, in response to deployment of said parachute under said aircraft disabled conditions, for substantially reducing rotation of said parachute housing as induced by said rotor hub assembly through said bearing means under weight load support conditions of said aircraft by said safety lowering or descent parachute.

4. A safety system as set forth in claim 1, wherein:
   said ball bearing means comprises two sets of vertically spaced ball bearing assemblies.

5. A safety system as set forth in claim 4, wherein said two sets of ball bearing assemblies comprises:
   a first outer bearing race support plate secured to the underside of said parachute housing;
   a second outer bearing race support plate secured to said first outer bearing race support plate; and
   an inner bearing race support plate secured to said rotor hub assembly.

6. A safety system as set forth in claim 5, wherein:
   said second outer bearing race support plate has a substantially U-shaped cross-sectional configuration; and
   said inner bearing race support plate has a substantially T-shaped cross-sectional configuration.

7. A safety system as set forth in claim 5, further comprising:
   parachute shroud line attachment means secured to said first outer bearing race support plate for projecting vertically upwardly through the bottom of said parachute housing so as to extend interiorly within said parachute housing whereby shroud lines of said parachute can be attached thereto.

8. A safety system as set forth in claim 1, wherein said rotation reduction means comprises:
   a plurality of air brakes pivotably mounted upon the outer peripheral surface of said parachute housing between a first stowed position at which said air brakes substantially concentrically surround said parachute housing, and a second deployed position at which said air brakes define predetermined angles with respect to said outer peripheral surface of said parachute housing for defining therewith air pockets within which air is captured for retarding rotation of said parachute housing.

9. A safety system as set forth in claim 8, further comprising:
cover means mounted upon said parachute housing for retaining said air brakes at said first stowed position.

10. A safety system as set forth in claim 9, further comprising:
magnetic means mounted upon said cover means and said parachute housing for retaining said cover means upon said parachute housing; and
explosive squib means for explosively removing said cover means from said parachute housing.

11. A safety system as set forth in claim 8, further comprising:
spring biasing means interposed between said air brakes and said parachute housing for moving said air brakes to said second deployed position.

12. A safety system as set forth in claim 8, wherein:
said air brakes comprise arcuate vanes disposed in a circular array about said outer peripheral surface of said parachute housing.

13. A safety system as set forth in claim 1, further comprising:
dust seal means secured to the underside of said parachute housing for covering said ball bearing means so as to prevent contamination of said ball bearing means.

14. A safety system as set forth in claim 2, wherein said rotation reduction means comprises:
a plurality of air brakes pivotably mounted upon the outer peripheral surface of said parachute housing between said first stowed position at which said air brakes substantially concentrically surround said parachute housing, and said second deployed position at which said air brakes define predetermined angles with respect to said outer peripheral surface of said parachute housing for defining therewith air pockets within which air is captured for retarding rotation of said parachute housing.

15. A safety system as set forth in claim 14, further comprising:
cover means mounted upon said parachute housing for retaining said air brakes at said first stowed position.

16. A safety system as set forth in claim 15, further comprising:
magnetic means mounted upon said cover means and said parachute housing for retaining said cover means upon said parachute housing; and
explosive squib means for explosively removing said cover means from said parachute housing.

17. A safety system as set forth in claim 14, further comprising:
spring means interposed between said air brakes and said parachute housing for moving said air brakes to said second deployed position.

18. A safety system as set forth in claim 14, wherein:
said air brakes comprise arcuate vanes disposed in a circular array about said outer peripheral surface of said parachute housing.

19. A safety system as set forth in claim 3, wherein:
said air brake means are disposed at predetermined angles with respect to said outer peripheral surface of said parachute housing for defining therewith air pockets within which air is captured for retarding rotation of said parachute housing.

20. A safety system as set forth in claim 19, further comprising:
cover means mounted upon said parachute housing for retaining said air brakes at said first stowed position.

* * * * *